Aug. 1, 1933.  E. L. PARKER  1,920,880
PROPELLER CONSTRUCTION
Filed Jan. 13, 1932  3 Sheets-Sheet 1
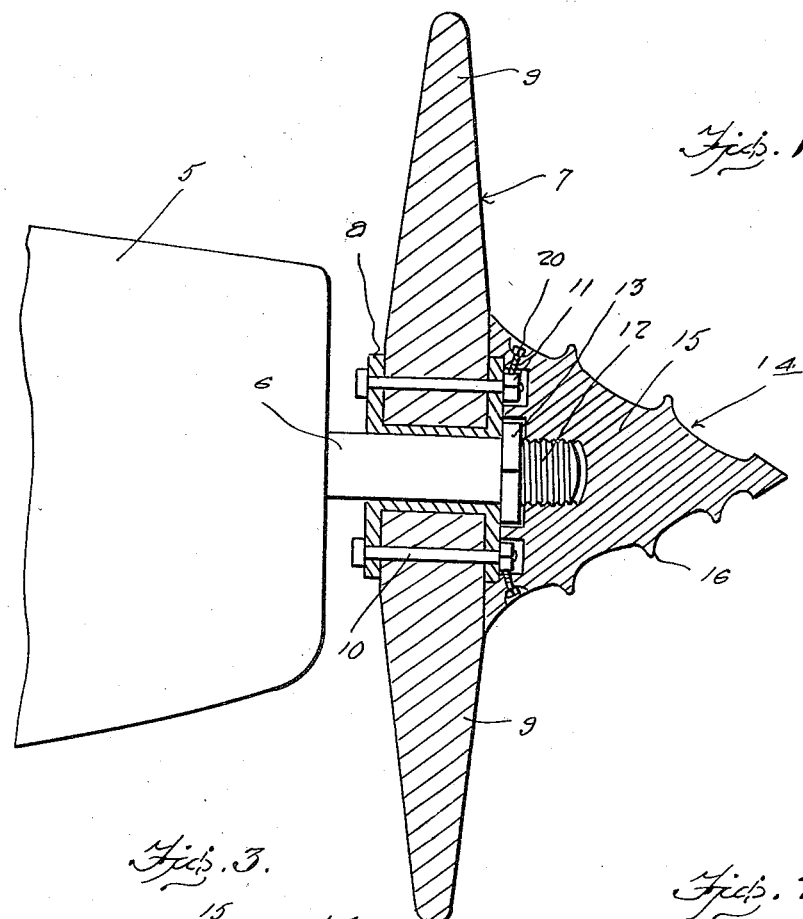
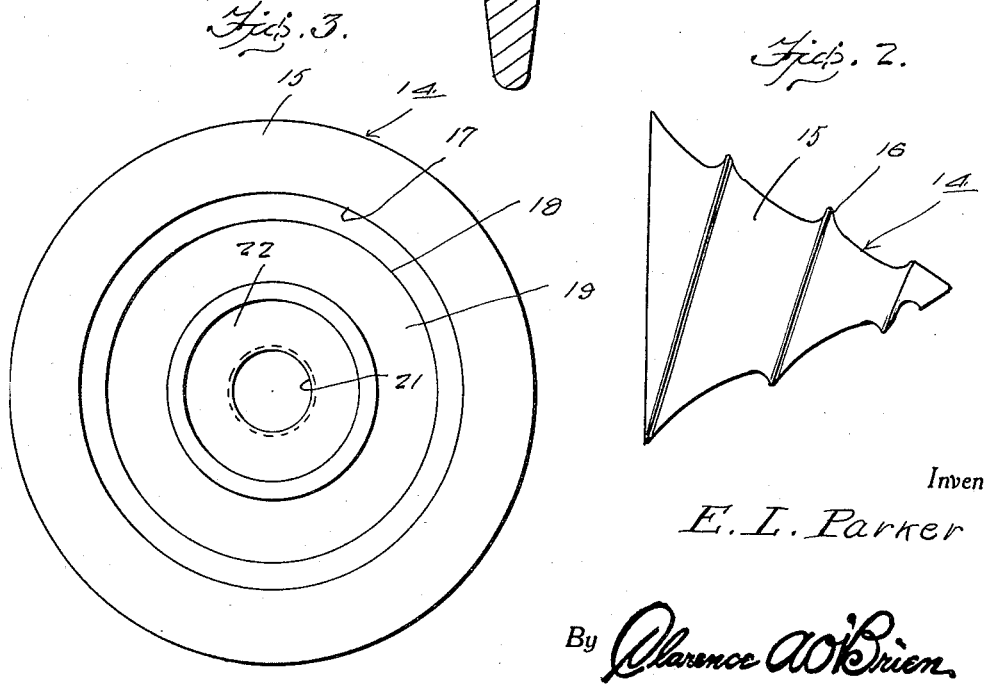
Inventor
E. L. Parker
By Clarence A. O'Brien
Attorney

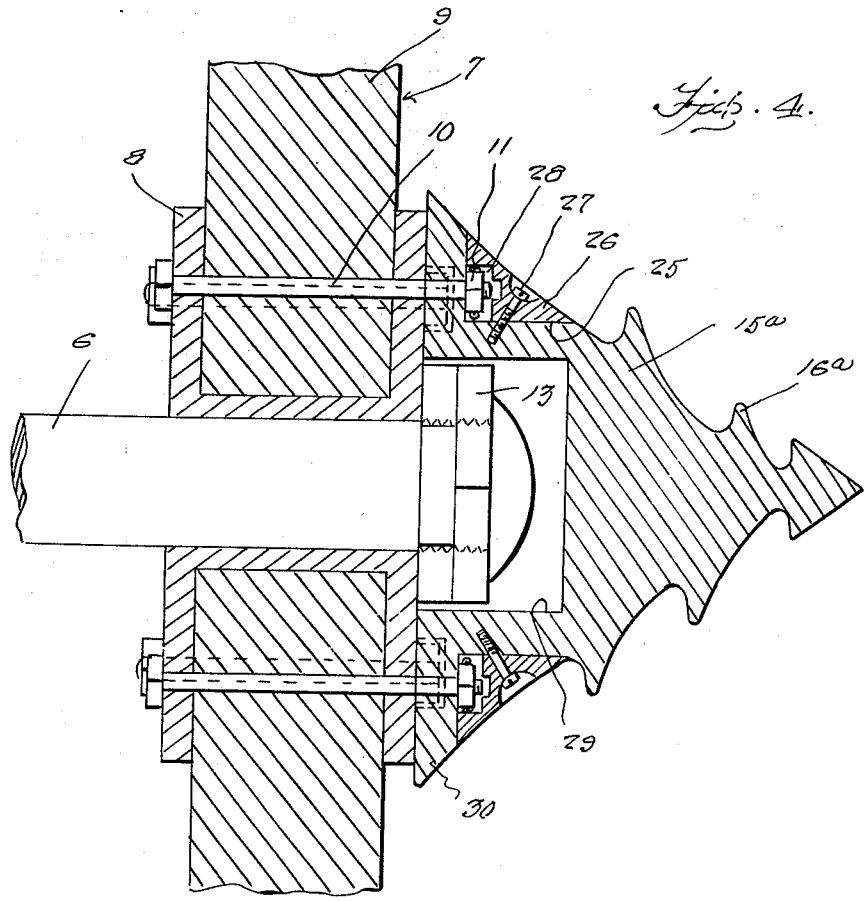
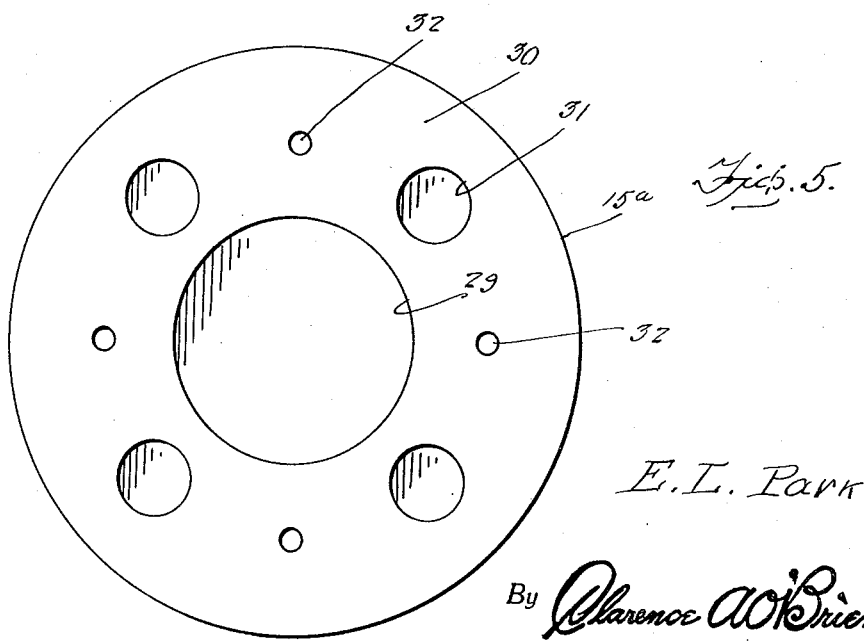

Aug. 1, 1933.  E. L. PARKER  1,920,880
PROPELLER CONSTRUCTION
Filed Jan. 13, 1932   3 Sheets-Sheet 3
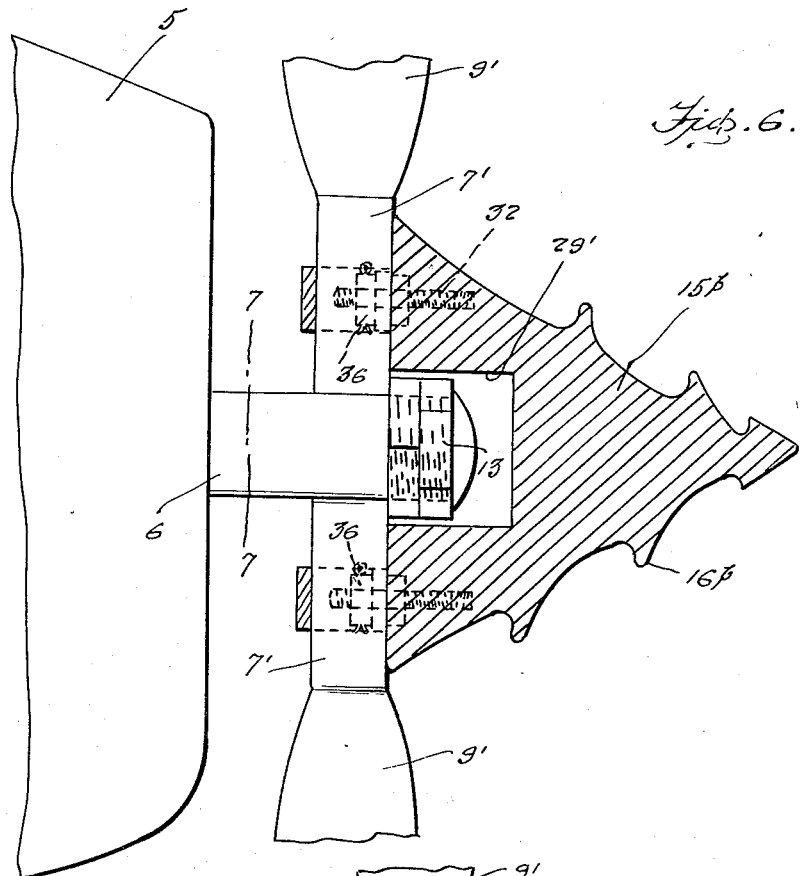
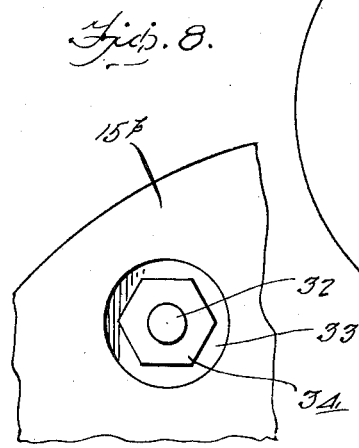
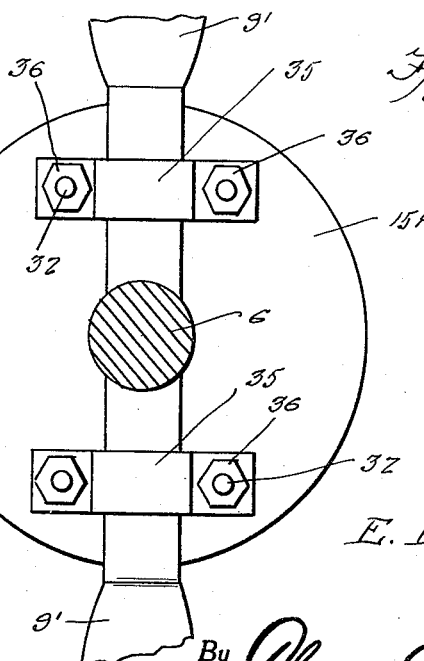
Inventor
E. L. Parker
By Clarence A. O'Brien
Attorney Patented Aug. 1, 1933

1,920,880

UNITED STATES PATENT OFFICE 1,920,880

PROPELLER CONSTRUCTION

Elgia Lawerence Parker, Hobart, Ind.

Application January 13, 1932. Serial No. 586,409

1 Claim. (Cl. 170—173)

The invention appertains to new and useful improvements in aircraft propulsion and more particularly to a novel propeller construction.

The principal object of this invention is to provide a propeller equipped with means for displacing air pressure outwardly toward the intermediate and tip portions of the propeller blades, to reduce resistance at the propeller hub.

Other important objects and advantages of the invention will become apparent to the reader of the following specification.

In the drawings:—

Figure 1 represents a vertical sectional view through a propeller showing the air displacing attachment thereon.

Fig. 2 represents a side elevational view of the attachment shown in Fig. 1.

Fig. 3 represents a rear end elevational view of the attachment shown in Fig. 1.

Fig. 4 represents a fragmentary vertical sectional view through a modification of the attachment shown in Fig. 1 and showing the same applied to a propeller.

Fig. 5 represents a rear end elevational view of the attachment shown in Fig. 4.

Fig. 6 represents a vertical sectional view through another modification of the air displacing screw shown in Fig. 1, the same being shown attached to a propeller.

Fig. 7 represents a sectional view taken substantially on line 7—7 of Fig. 6.

Fig. 8 represents a fragmentary rear end elevational view of the attachment shown in Fig. 6 detached from the propeller.

Referring to the drawings wherein like numerals designate like parts, it can be seen in Fig. 1, that numeral 5 represents the engine housing portion of an aircraft fuselage with the drive shaft 6 projecting therefrom. Numeral 7 represents generally a propeller, which includes the hub 8 and the blades 9 radiating therefrom. These blades 9 are secured to the hub 8 by the bolts 10, each of which is provided with a nut at its forward end, which is numbered 11.

The drive shaft 6 is provided with a threaded forward end portion 12 and a nut 13 is engaged thereon and against the hub 8 to prevent displacement of the propeller proper. The attachment is generally denoted by numeral 14 and includes a conical-shaped body 15, having a longitudinally extending spiral thread 16 thereon.

As is clearly shown in Fig. 3, the rear end of the body 15 is provided with a circular recess 17 having a shoulder 18 therein, against which the forward end of the hub 8 rests. The nuts 11 engage into the annular trough-like portion 19 of the recess 17 and set screws 20 are engageable through threaded openings in the rear end portion of the body 15 to abut against the nuts 11 to prevent rotation thereof.

The body 15 is provided with a threaded bore 21 extending inwardly from the rear end thereof to receive the threaded portion 12 of the drive shaft 6 while surrounding this bore 21 at its rear end is a trough-like depression 22 for receiving the nut 13 on the threaded portion 12. It can be seen, that the spirally threaded body 15 is primarily retained by threaded portions 12 of the shaft 6 and secondarily retained against displacement by the screw screws 20 biting against the nuts 11.

As is shown in Fig. 4, a modification of the structure shown in Fig. 1 involves a conical-shaped body 15a provided with a longitudinally extending spiral thread 16a which is reduced adjacent its rear end portion to provide a cylindrical formation 25 over which is engageable the removable collar 26 retained to the cylindrical portion 25 by the set screws 27. This collar 26 at its rear side is provided with recesses 28 to accommodate the nuts 11 on the bolts 10, which serve to secure the aforementioned blades of the propeller 7 to the hub 8 on the drive shaft 6.

The drive shaft 6 is threaded in the present case and provided with nuts 13 and this end portion of the drive shaft is disposed into the pocket 29 of the body 15a. The rear end portion of the body 15a rearwardly of the cylindrical portion 25 is provided with a circumferential flange 30, the rear side of which is provided with circular recesses 31 to accommodate the nuts 11 on certain of the bolts 10 which are shorter than the other bolts.

The longer bolts extend through the flange 13 and are equipped with nuts 11 which engage into the recesses 28 of the collar 26 while the shorter bolts have their nuts engaging into the recesses 31 aforementioned. The longer bolts extend through opening 32 in the flange 30.

An additional modification of the invention is disclosed in Figs. 6, 7 and 8 wherein numeral 15b represents the conical body of the attachment and this is provided with the longitudinally extending spiral thread 16b which is provided axially with the recess 29' for receiving the nut 13 on the forward end of the drive shaft 6.

In this type of the invention, the propeller blades 9' extend optwardly from the shaft 6, the same being suitably formed therewith and to the shank portions 7' of the propeller blades 9', the body 15b is secured. The rear end of the body 15b is provided with an upper and lower pair of threaded members 32 which project rearwardly therefrom.

Circumscribing each of the threaded members 32 in the rear end of the body 15b, is a recess 33 for accommodating a nut 34 on the member 32 at each of these members 32 is disposed through one end of a clamp plate 35. Obviously, by feeding the nuts 36 on the members 32 against the plates 35 to clamp the same against the nuts 34, the body 15b can be firmly secured to the propeller.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

In a propeller, a drive shaft, a hub on the drive shaft, propeller blades, bolts for securing the blades to the hub, a screw body having a concentric groove therein, nuts on the bolts, said screw body having its groove receiving the nut engaged ends of the bolts, and a set screw disposed through the body to bind against one of the nuts to prevent rotation of the screw body with respect to the hub.

ELGIA LAWERENCE PARKER.